(12) United States Patent
Wang et al.

(10) Patent No.: US 10,484,995 B2
(45) Date of Patent: Nov. 19, 2019

(54) JOINT PROCEDURE FOR BEAM MANAGEMENT AND PARTIAL CONTROL BEAM FAILURE RECOVERY

(71) Applicant: AT&T Intellectual Property I, L.P., Atlanta, GA (US)

(72) Inventors: Xiaoyi Wang, Austin, TX (US); Salam Akoum, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/285,420

(22) Filed: Feb. 26, 2019

(65) Prior Publication Data
US 2019/0191427 A1   Jun. 20, 2019

Related U.S. Application Data

(63) Continuation of application No. 15/705,946, filed on Sep. 15, 2017, now Pat. No. 10,257,836.

(51) Int. Cl.
*H04W 24/10* (2009.01)
*H04W 72/04* (2009.01)
(Continued)

(52) U.S. Cl.
CPC ........ *H04W 72/046* (2013.01); *H04B 7/0408* (2013.01); *H04B 7/063* (2013.01);
(Continued)

(58) Field of Classification Search
CPC ........... H04W 72/046; H04W 72/0406; H04W 24/10; H04L 5/0048
See application file for complete search history.

(56) References Cited

U.S. PATENT DOCUMENTS 8,570,963 B2   10/2013   Barany et al.
8,917,614 B2   12/2014   Luo et al.
(Continued)

FOREIGN PATENT DOCUMENTS

WO   2009/137092 A1   11/2009
WO   2016/208991 A1   12/2016
(Continued)

OTHER PUBLICATIONS

Notice of Allowance received for U.S. Appl. No. 15/705,946 dated Nov. 27, 2018, 42 pages.
(Continued)

*Primary Examiner* — Chuong A Ngo
(74) *Attorney, Agent, or Firm* — Amin, Turocy & Watson, LLP

(57) ABSTRACT

The described technology is generally directed towards a joint procedure in wireless communications for reporting a partial beam failure or performing beam management when no beams have failed. The joint procedure reports the beam management reference signal received power and control beam recovery on a common feedback channel, which avoids the need for a reserved, dedicated feedback channel resource for beam recovery. Also described is configuring a possibly different failure threshold for each selected beam, whereby the network can configure different beams to have different reliability/quality-of-service levels for example.

20 Claims, 11 Drawing Sheets

(51) Int. Cl.
*H04L 5/00* (2006.01)
*H04B 7/0408* (2017.01)
*H04B 7/06* (2006.01)
*H04B 7/08* (2006.01)
*H04W 28/18* (2009.01)
*H04W 72/08* (2009.01)
*H04W 74/08* (2009.01)
*H04B 17/318* (2015.01)
*H04W 76/10* (2018.01)

(52) U.S. Cl.
CPC ......... *H04B 7/0617* (2013.01); *H04B 7/0619* (2013.01); *H04B 7/0695* (2013.01); *H04B 7/088* (2013.01); *H04B 17/318* (2015.01); *H04L 5/006* (2013.01); *H04L 5/0025* (2013.01); *H04L 5/0048* (2013.01); *H04W 24/10* (2013.01); *H04W 28/18* (2013.01); *H04W 72/042* (2013.01); *H04W 72/0406* (2013.01); *H04W 72/0413* (2013.01); *H04W 72/08* (2013.01); *H04W 74/0833* (2013.01); *H04W 76/10* (2018.02)

(56) References Cited

U.S. PATENT DOCUMENTS

| | | |
|---|---|---|
| 9,237,475 B2 | 1/2016 | Josiam et al. |
| 9,408,220 B2 | 8/2016 | Gore et al. |
| 9,456,359 B2 | 9/2016 | Kim et al. |
| 9,526,089 B2 | 12/2016 | Jang et al. |
| 9,537,554 B2 | 1/2017 | Ding et al. |
| 9,602,177 B2 | 3/2017 | Ko et al. |
| 2008/0212615 A1 | 9/2008 | Ranta-Aho et al. |
| 2011/0110453 A1 | 5/2011 | Prasad et al. |
| 2014/0003240 A1 | 1/2014 | Chen et al. |
| 2014/0073337 A1 | 3/2014 | Hong et al. |
| 2015/0257073 A1* | 9/2015 | Park ............... H04B 7/0408 370/331 |
| 2016/0105872 A1 | 4/2016 | Kuo |
| 2016/0226642 A1 | 8/2016 | Aiba et al. |
| 2017/0005764 A1 | 1/2017 | Park et al. |
| 2017/0012724 A1 | 1/2017 | Zirwas |
| 2017/0070277 A1 | 3/2017 | Si et al. |
| 2017/0094531 A1 | 3/2017 | Kakishima et al. |
| 2017/0195020 A1 | 7/2017 | Ko et al. |
| 2017/0207843 A1 | 7/2017 | Jung et al. |
| 2018/0227899 A1* | 8/2018 | Yu ............... H04B 7/0695 |
| 2018/0279286 A1 | 9/2018 | Akoum et al. |

FOREIGN PATENT DOCUMENTS

| | | |
|---|---|---|
| WO | 2017/003327 A1 | 1/2017 |
| WO | 2017/160052 A2 | 9/2017 |

OTHER PUBLICATIONS

Giordani et al., "An Efficient Uplink Multi-Connectivity Scheme for 5G mmWave Control Plane Applications", Jul. 21, 2017, pp. 1-32.
Tang et al., "Opportunistic Feedback for Multiuser MIMO Systems With Linear Receivers", IEEE Transactions on Communications, vol. 55, No. 5, 2007, pp. 1020-1032.
Wang et al., "A Unified Approach to QoS-Guaranteed Scheduling for Channel-Adaptive Wireless Networks", Proceedings of the IEEE, vol. 95, No. 12, Dec. 2007, pp. 2410-2431.
International Search Report and Written Opinion received for PCT Application Serial No. PCT/US2018/050113 dated Jan. 7, 2019, 11 pages.
AT&T., "Beam Failure Recovery Mechanism and RLF", 3GPP Draft; R2-1706680 http://www.3gpp.org/ftp/tsg_ran/WG2_RL 2/TSGR2_AHs/2017_06_NR/Docs/, 3rd Generation Partnership Project (3gpp), Mobile Competence Centre, 7 pages.
AT&T., "Considerations on Beam Failure Recovery Mechanism", 3GPP Draft; RI-1710431, http://www.3gpp.org/ftp/Meetings_3GPP_SYNC/RAN1/Docs/, 3rd Generation Partnership Project (3gpp), Mobile Competence Centre, 4 pages.
Mediatek Inc., "Offline Discussion on Beam Recovery Mechanism", 3GPP Draft;RI-1715012 http://www.3gpp.org/ftp/tsg_ran/WG1_RL1/TSGR1_90/Docs/, 3rd Generation Partnership Project (3gpp), Mobile Competence Centre, 12 pages.
Giordani et al.,"Uplink-Based Framework for Control Plane Applications in 5G mmWave Cellular Networks", Oct. 16, 2016, pp. 1-31.

* cited by examiner

JOINT PROCEDURE FOR BEAM MANAGEMENT AND PARTIAL CONTROL BEAM FAILURE RECOVERY

RELATED APPLICATION

The subject patent application is a continuation of, and claims priority to, U.S. patent application Ser. No. 15/705,946, filed Sep. 15, 2017, and entitled "JOINT PROCEDURE FOR BEAM MANAGEMENT AND PARTIAL CONTROL BEAM FAILURE RECOVERY," the entirety of which application is hereby incorporated by reference herein.

TECHNICAL FIELD

The subject application is related to wireless communication systems, and, for example, to reporting beam information in a wireless communication system.

BACKGROUND

New radio (NR) networks such as fifth generation (5G) NR networks are designed for deployment in the radio frequency spectrum between 30 GHz and 300 GHz, referred to as the millimeter wave (mmWave) spectrum. Unlike other mobile communication frequency ranges, in the mmWave spectrum, the beam pair between the network (via a distributed unit) and the user equipment may experience a blockage, such as due to a physical obstruction caused by objects near the user, or even the user's own self, which interrupts the communication. The narrow beamforming of NR is also part of such a blockage effect.

There are two technologies introduced in NR to overcome the blockage effect. A first technology is beam management, which is a procedure for user equipment to report back to the network the measured power of received reference signals, referred to as Reference Signal Received Power (RSRP), to select the best beam for transmission. A second technology that overcomes the blockage effect and provides robustness to a connection is beam recovery, which takes place upon beam failure; beam failure is declared when all of the control channel resource sets (CORESET) failed.

Neither beam management nor beam recovery addresses a partial control channel failure, in which one or more control channel beams remain workable, while one or more others are considered to have failed. However, most of the time a recovery signal is not transmitted, and thus it is inefficient to configure resources for such a situation.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
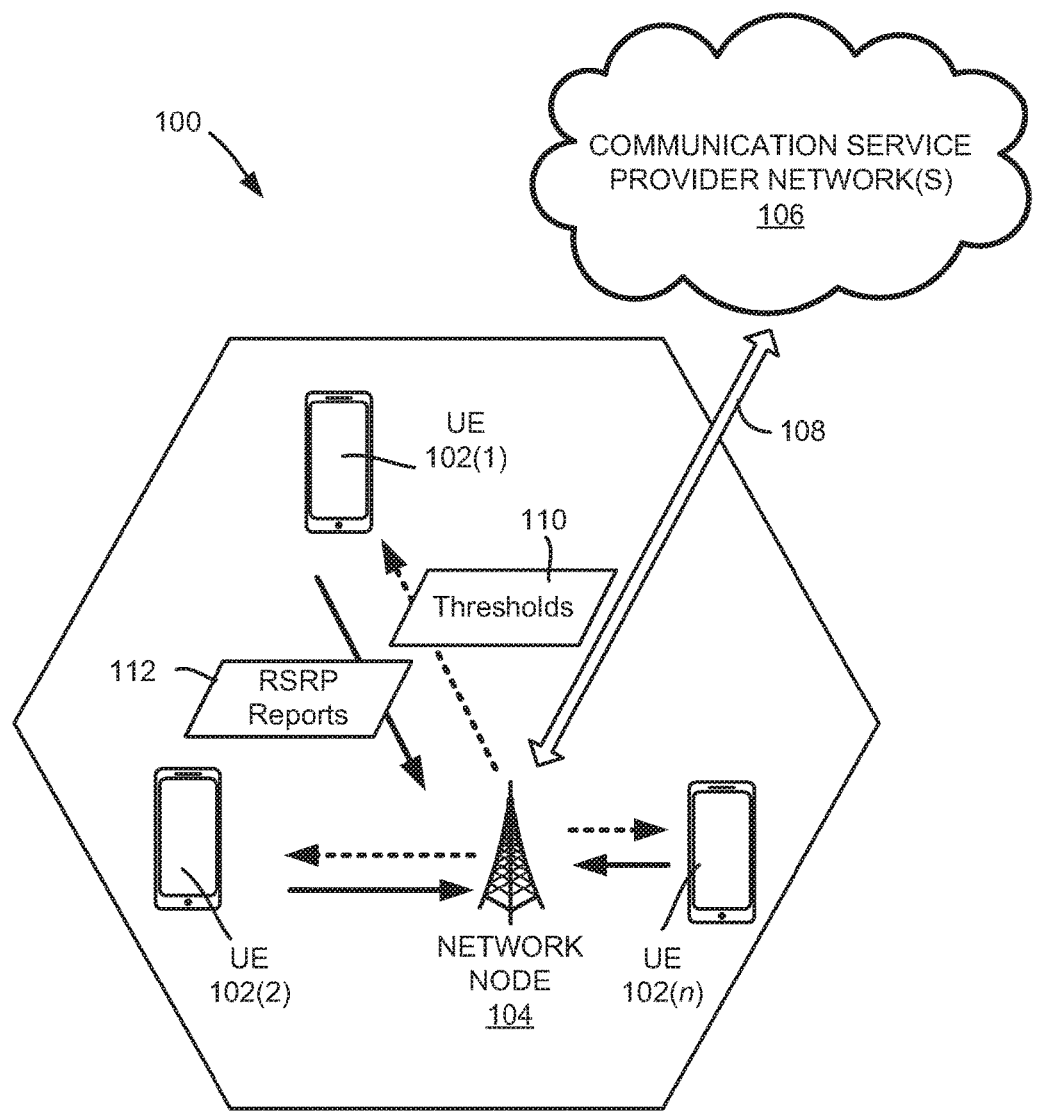
FIG. 1 illustrates an example wireless communication system in which a network node device (e.g., network node) and user equipment (UE) can implement various aspects and implementations of the subject disclosure.

Briefly, one or more aspects of the technology described herein are generally directed towards a joint procedure to handle beam management and partial control beam failure reporting for recovery. In one or more aspects, the joint procedure technology utilizes a common physical uplink control channel feedback channel to carry two different types of indicators; one indicator is for the beam management reporting and another for the partial control beam failure reporting.

An event with one or more threshold values is configured at the network device and provided to the user equipment to determine when to indicate the failure of existing beams and when to indicate the reference signal received power (RSRP) of new beams. In general the user equipment is configured with a reference signal setting and a reference signal received power measurement setting. The reference signal setting includes a list of reference signal resources, which may be a channel state information reference signal channel quality information or a synchronization signal-block). The reference signal received power measurement setting includes a list of beams for which the user equipment needs to measure reference signal received power. Each measurement is associated with a reference signal resource in the reference signal setting.

In the reference signal setting, a reference signal is marked as the selected beam; (normally the selected beam is associated with a control channel CORESET). When the user equipment needs to report the reference signal received power measurements, the user equipment first checks the reference signal received power of selected beams of a search space and compares each to a failure criterion, which in one implementation comprises a threshold (T_out) configured for each selected beam.

Note that the network may configure different T_out values for different beams. For example, the configured value of T_out may be dependent on the Reference Signal type (synchronization signal block or channel state information reference signal), and/or the quality of service requirements for the traffic planned on that beam. As a result, the threshold for each selected beam can be configured corresponding to the traffic quality of service and/or reference signal types, whereby the network can configure beams with different reliability characteristics.

Once the reference signal received power measurements are obtained for the selected beams, they are each compared against the threshold associated with that beam. If each of the selected beams has a reference signal received power smaller than the T_out configured to that beam, the user equipment declares a beam failure and performs the PRACH (Physical Random Access Channel)—based recovery.

If one or more (but not all) of the selected beams has a reference signal received power measurement that does not satisfied the threshold value associated with that beam, that is, the measurement is smaller than its associated T_out, the user equipment reports the index of the selected beam and its corresponding measured reference signal received power.

If none of the selected beams has a reference signal received power below its associated T_out threshold value, the user equipment starts the regular beam management procedure. As is known, this procedure finds the maximum reference signal received power for the configured channel state information reference signal or synchronization signal block. In other words, if each of the control channel respective measured RSRPs satisfy their respective thresholds, the user equipment measures the RSRP of other configured Reference Signal resources not associated with control channels, and reports the best RSRP of the configured Reference Signal resources (including the Reference Signal resources corresponding to or not corresponding to the control channel beams). Note that multiple channel state information reference signal or synchronization signal block can be configured as a subgroup; in that case, the user equipment reports one maximum reference signal received power per each subgroup.

As will be understood, the technology described herein thus is able to use a joint procedure for reporting the beam management reference signal received power and the control beam recovery on a common feedback channel. This avoids having to have a reserved, dedicated feedback channel resource for the beam recovery case. Instead, the beam recovery indicator shares the feedback channel resource with the beam management reference signal received power report.

It should be understood that any of the examples and terms used herein are non-limiting. For instance, the examples are based on New Radio (NR, sometimes referred to as 5G) communications between a user equipment exemplified as a smartphone or the like and network device; however virtually any communications devices may benefit from the technology described herein, and/or their use in different spectrums may likewise benefit. Thus, any of the embodiments, aspects, concepts, structures, functionalities or examples described herein are non-limiting, and the technology may be used in various ways that provide benefits and advantages in radio communications in general.

FIG. 1 illustrates an example wireless communication system 100 in accordance with various aspects and embodiments of the subject technology. In one or more embodiments, the system 100 can comprise one or more user equipment UEs 102(1)-102(n).

In various embodiments, the system 100 is or comprises a wireless communication network serviced by one or more wireless communication network providers. In example embodiments, a UE 102 can be communicatively coupled to the wireless communication network via a network node 104. The network node (e.g., network node device) can communicate with the user equipment (UE), thus providing connectivity between the UE and the wider cellular network.

In example implementations, each UE such as the UE 102(1) is able to send and/or receive communication data via a wireless link to the network node 104. The dashed arrow lines from the network node 104 to the UE 102 represent downlink (DL) communications and the solid arrow lines from the UE 102 to the network nodes 104 represents uplink (UL) communications.

The system 100 can further include one or more communication service provider networks 106 that facilitate providing wireless communication services to various UEs, including UES 102(1)-102(n), via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to an improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, a user equipment (e.g., 102(1)) is configured to receive threshold values 110 from the network node, for use in determining beam failures. In general, the user equipment compares the reference signal received power (RSRP) for each selected beam against the threshold associated with that beam to determine whether that beam is considered to be in a failure state or not. If no beams are in a failed state, an RSRP report 112 is sent to the network node in a conventional beam management procedure. If some beams (but not all) are in a failure state, an RSRP report 112 is sent to the network node for partial failure reporting.

Figure 2:
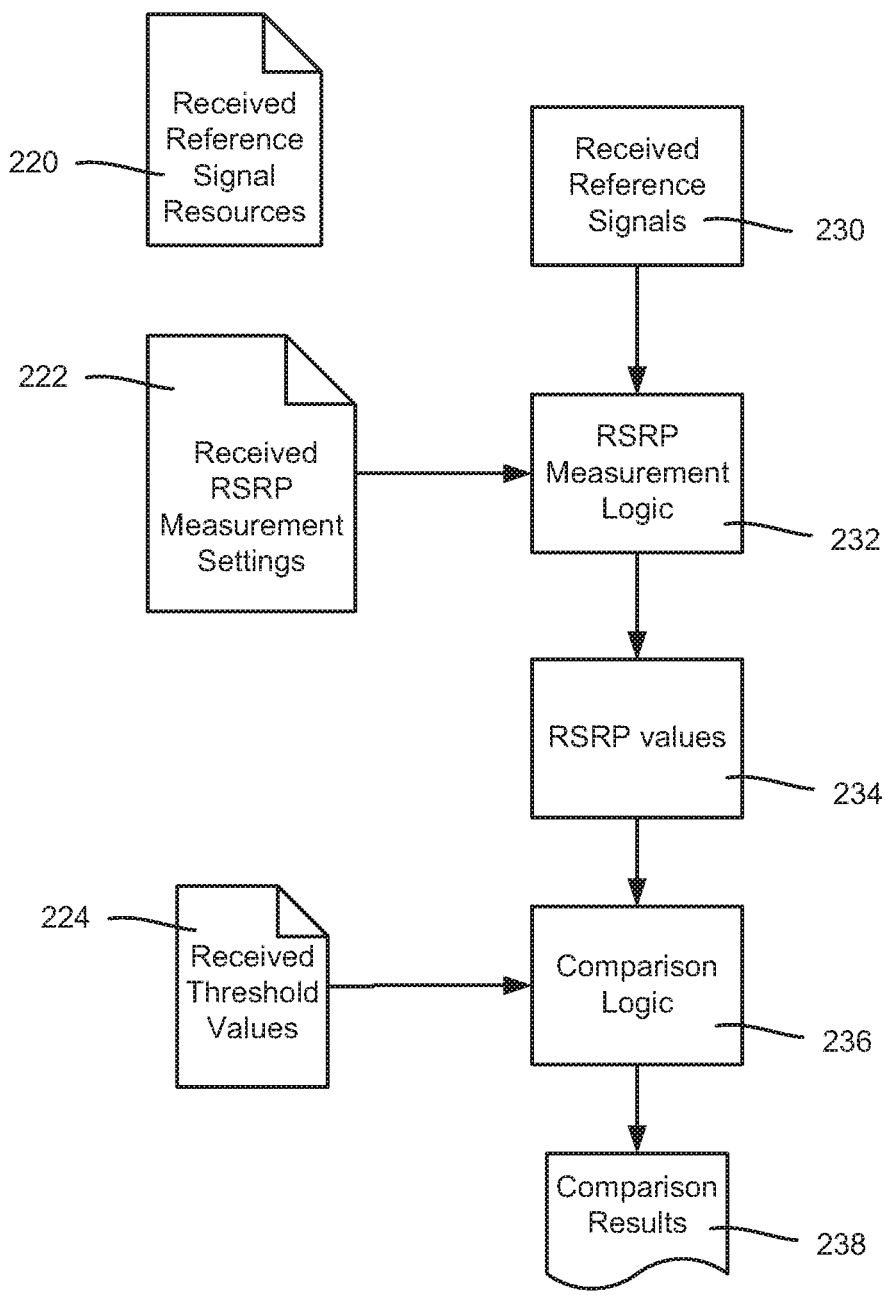
FIG. 2 illustrates a block diagram example of evaluating reference signal received power (RSRP) information against threshold values to obtain comparison results, in accordance with various aspects and implementations of the subject disclosure.

FIG. 2 represents information received by user equipment and components that process the information into beam success or failure results. Along with receives reference signal resources 220, the user equipment receives RSRP measurement settings 222 that indicate what the user equipment needs to measure with respect to power of received beams. The user equipment also receives threshold values 224, e.g., one threshold value per beam.

As represented in FIG. 2, the received reference signals 230 are measured by RSRP measurement logic 232 of the user equipment to provide the RSRP values 234. For each selected beam, the RSRP value for that beam is compared against the threshold value for that beam, e.g. via comparison logic 236. These comparison results 238 are used to determine what further actions to take.

Figure 3:
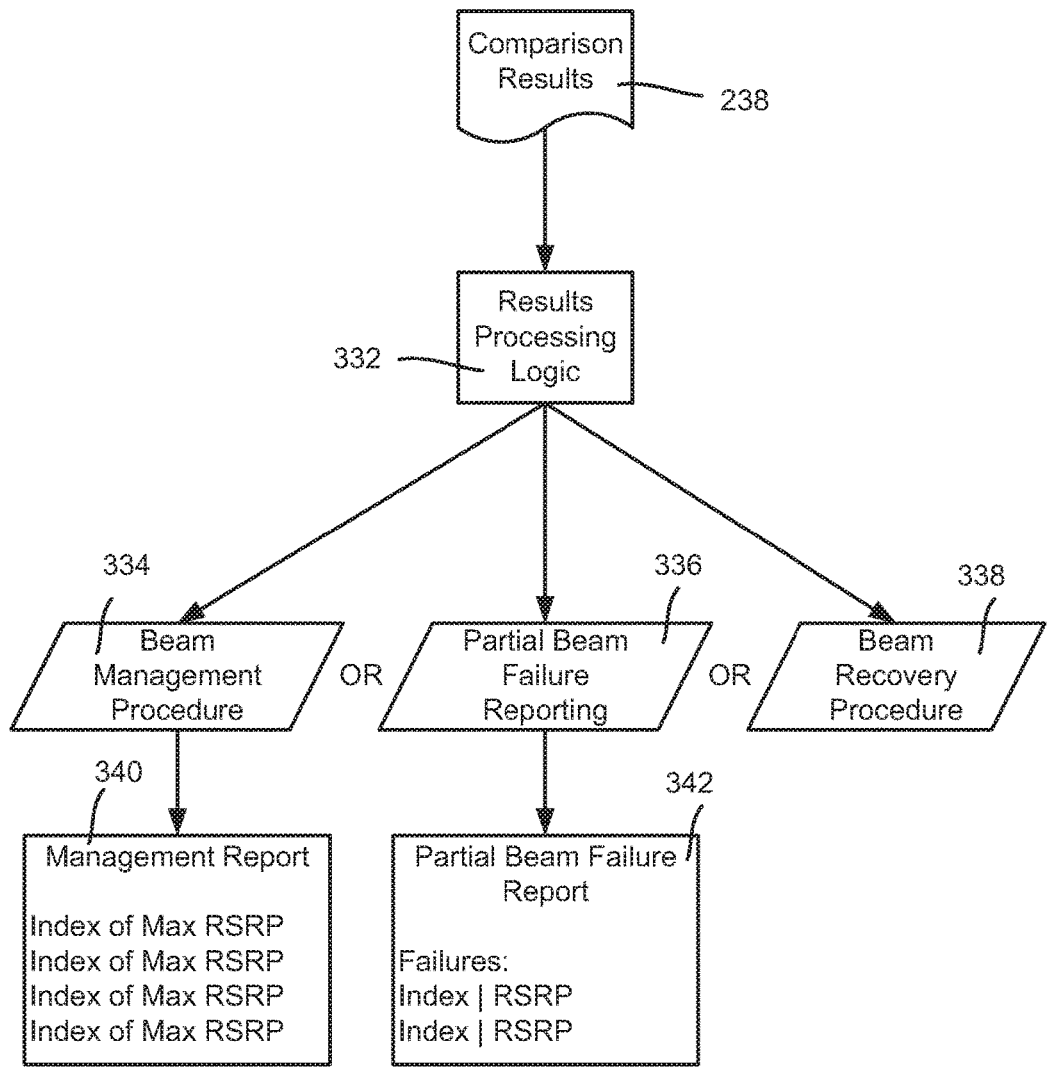
FIG. 3 illustrates a block diagram example of processing the comparison result of FIG. 2, in accordance with various aspects and implementations of the subject disclosure.

FIG. 3 shows the use of the comparison results 238 by results processing logic 332. As will be understood, based on whether each beam passed or failed with respect to the evaluation criterion (the measured power versus the threshold value per beam), a beam management procedure 334, partial beam failure reporting 336 or a beam recovery procedure 338 is performed. The beam management procedure 334 and the beam recovery procedure 338 may be conventional procedures.

The beam management procedure 334 takes place when all selected beams are considered to not be in a failure state, and results in a management report 340 that identifies the beam(s) having the maximum RSRP value(s). Again, note that this measures the RSRPs of the configured reference signal resources (including the reference signal resources corresponding to or not corresponding to the control channel beams) and reports the maximum RSRPs; (per-subgroup maximums are reported if configured in subgroups). The beam recovery procedure 338 takes place when each selected beam is considered to be in a failure state.

The partial beam failure report occurs when some beams, but not all, are considered to be in a failure state three spec to the evaluation criterion, that is, the measured RSRP at least one beam has not met the threshold value. In one or more implementations, a partial beam failure report 342 is sent that identifies each failed beam (e.g. by its index) and its associated RSRP measurement.

Figure 4:
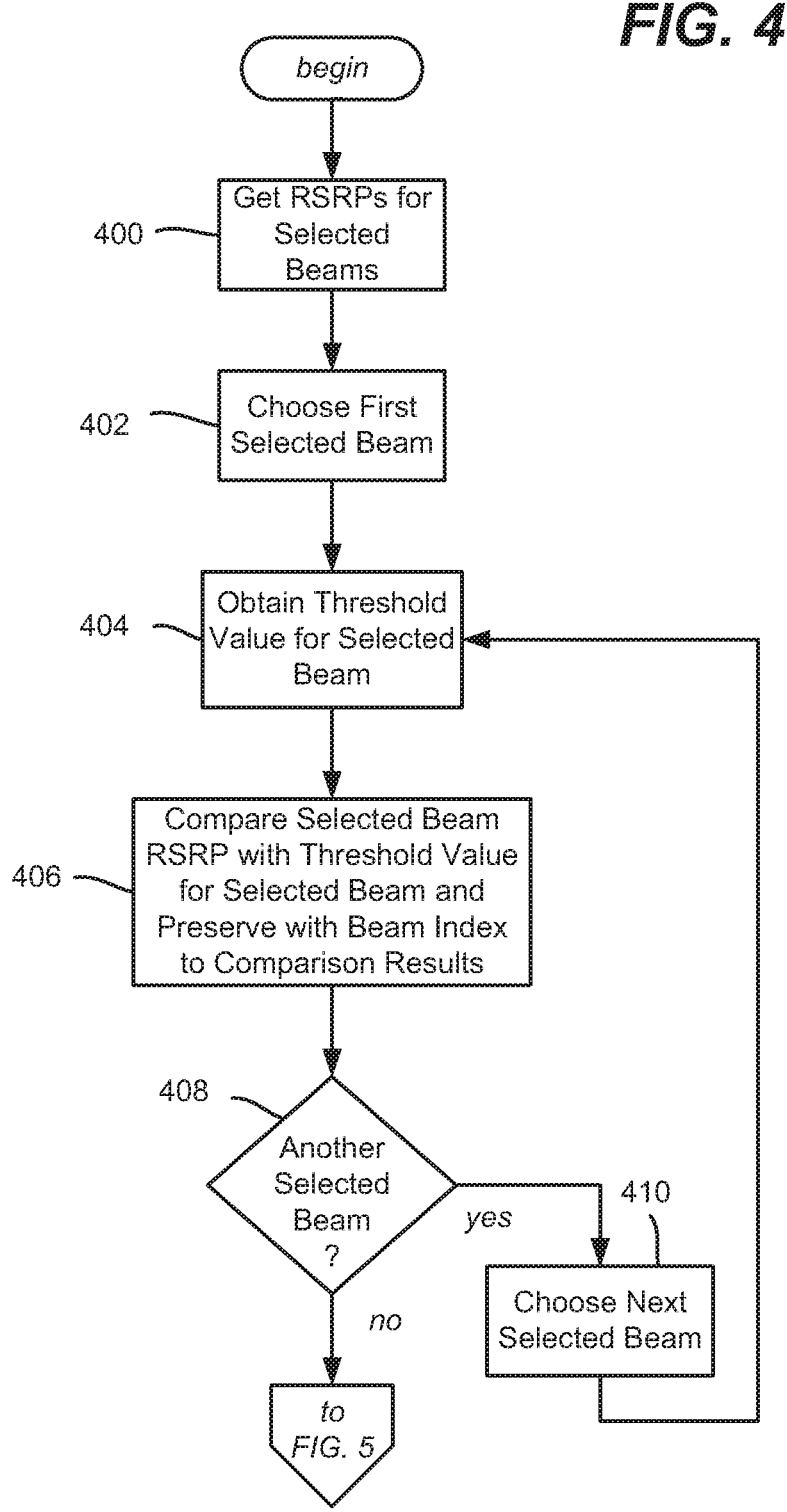
FIGS. 4-6 comprise an example flow diagram for generating beam failure reports or taking other actions via a joint procedure, in accordance with various aspects and implementations of the subject disclosure.
Figure 5:
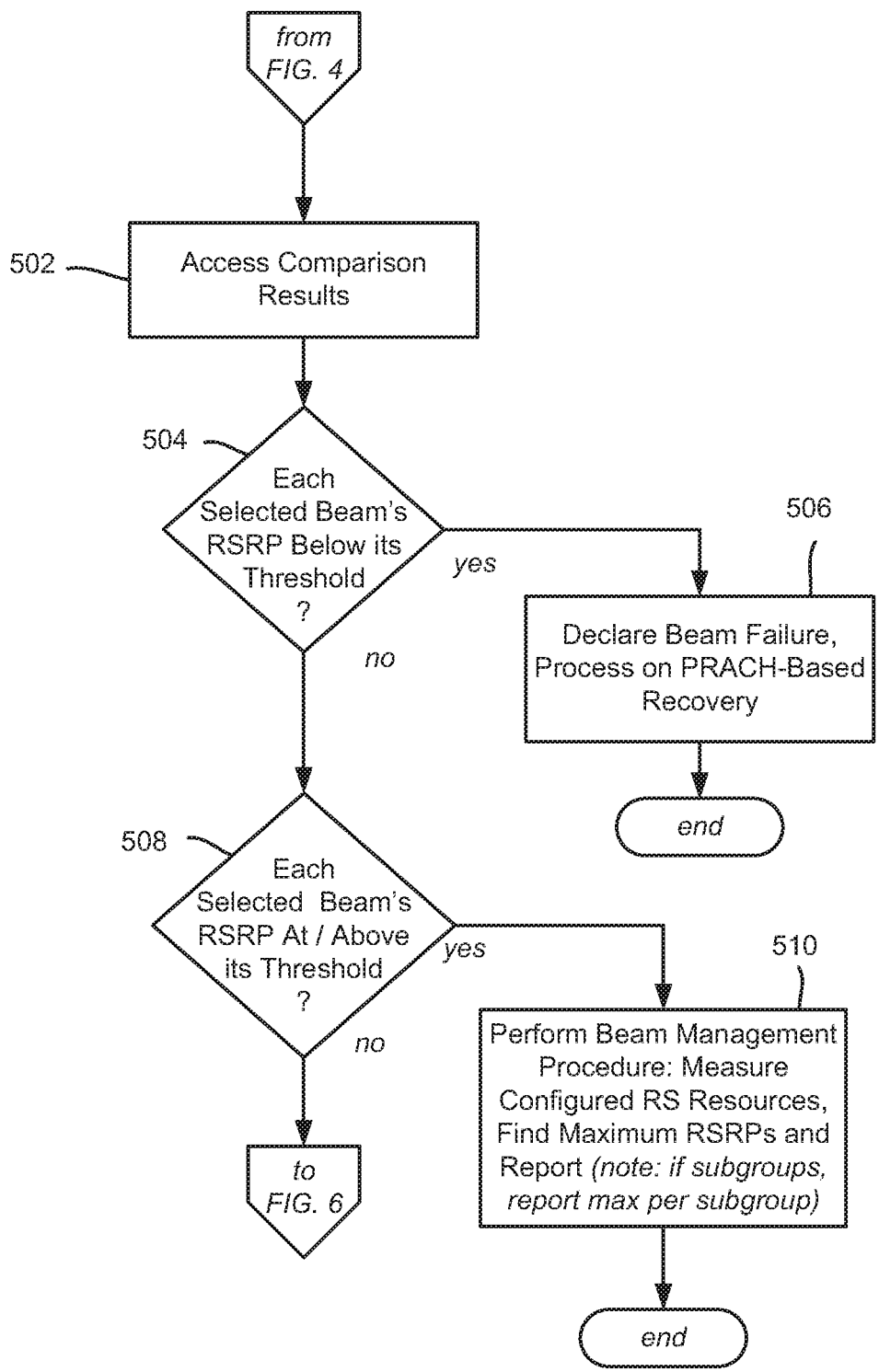
Figure 6:
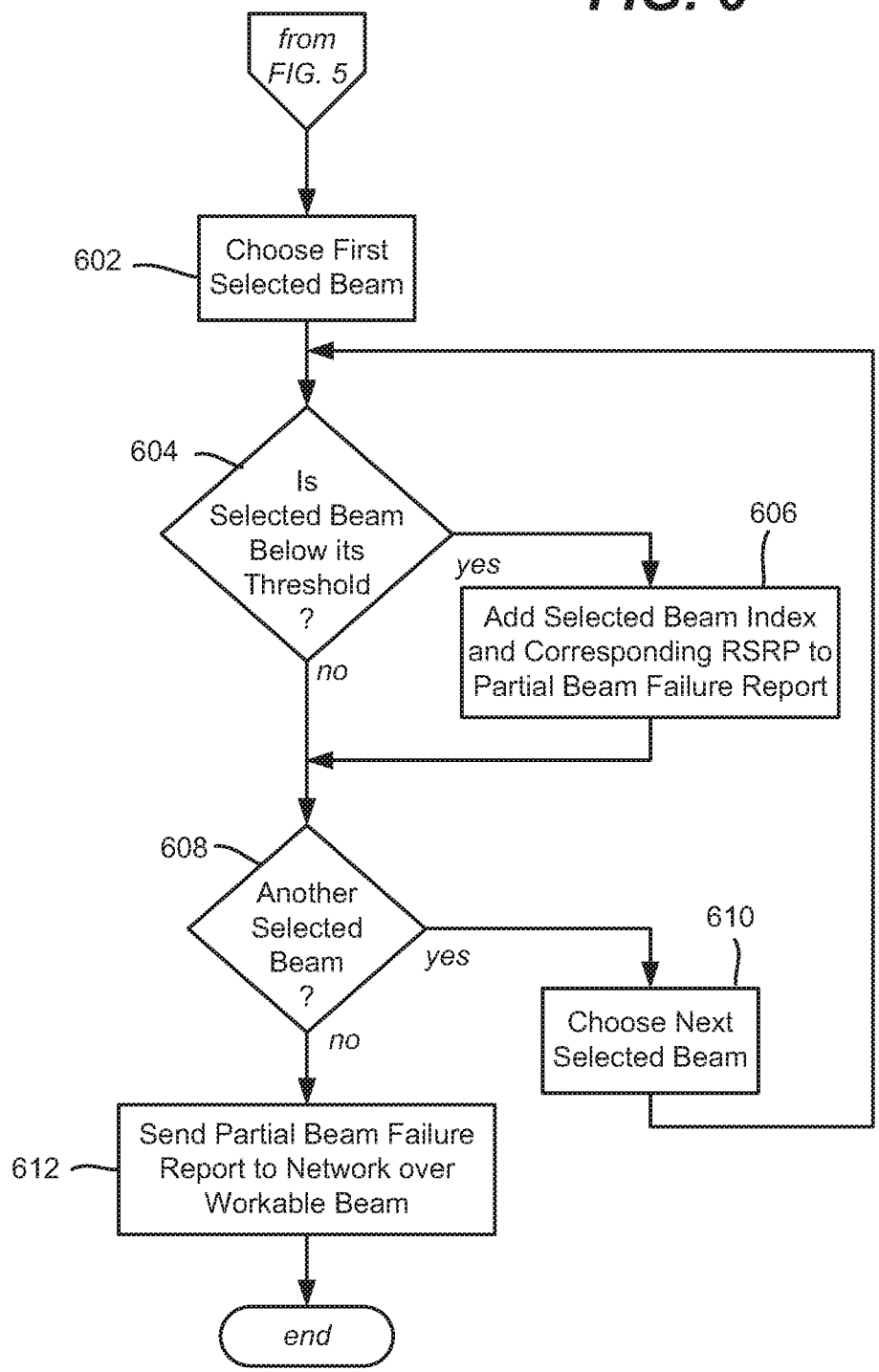

FIGS. 4-6 comprise a flow diagram summarizing example operations of the user equipment, exemplified as steps, with respect to RSRP measurements, threshold comparisons and results processing, beginning at step 400 which represents obtaining the RSRP values. Step 402 of FIG. 4 represents choosing a first selected beam. Step 404 obtains the threshold value for the selected beam, e.g., as provided by the network.

Step 406 compares the selected beam RSRP with the threshold value for the selected beam and preserves the result (e.g., pass or fail) in a set of comparison results. Steps 408 and 410 repeat the process for each other selected beam.

Step 502 of FIG. 5 represents accessing the comparison results for processing. Step 504 evaluates whether each selected beams are SRP is below its threshold, e.g., all beams have failed to achieve their associated thresholds. If so, step 506 represents declaring a beam failure, and performing the appropriate beam recovery procedure.

If at least one beam has met its associated threshold, step 508 evaluates whether each beam has passed the evaluation. If so, step 510 starts the regular beam management procedure. As set forth herein, this procedure finds and reports the maximum reference signal received power for the configured channel state information reference signal or synchronization signal block. Note that multiple channel state information reference signal or synchronization signal block can be configured as a subgroup; in that case, the user equipment reports one maximum reference signal received power per each subgroup.

If at least one beam has met its associated threshold but at least one other beam has not, a partial failure state exists. The operations of FIG. 6 are generally directed towards reporting those beams which have failed. Step 602 represents choosing a first selected beam, e.g., from the comparison results, and step 604 evaluates whether that beam is a failure or not. If a failure, step 606 adds the selected beam's index to a partial beam failure report along with the corresponding RSRP of that failed beam. Step 608 and 610 repeat the process, basically filtering out beams that have passed until the report is complete. When the report is ready, step 612 sends the partial beam failure report over a workable beam to the network device. It should be noted that the example operations of FIG. 6 generally may be performed in conjunction with the example operations of FIG. 4, e.g., build the partial failure report as the comparisons are taking place, and if the report is empty, perform beam management and send the beam management report (assuming at least one beam has passed the threshold evaluation).

As can be seen, described herein is a joint procedure technology to jointly handle beam management reports and a beam recovery indicator for partial beam failures. The joint procedure facilitates the sharing of the uplink feedback resource between two procedures, instead of having separate resources.

Figure 7:
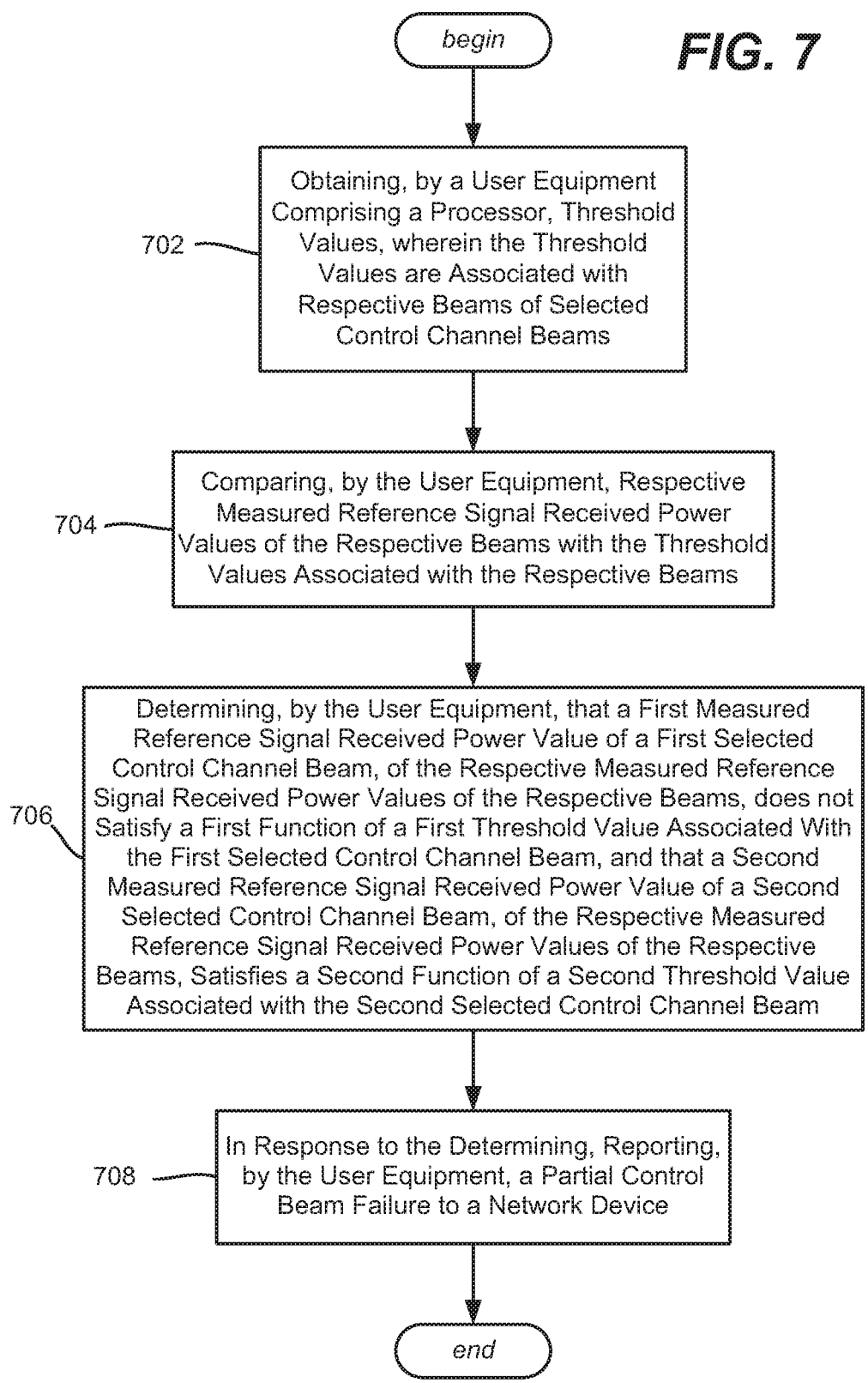
FIG. 7 illustrates an example flow diagram of aspects of user equipment operations, in accordance with various aspects and implementations of the subject disclosure.

One or more aspects, exemplified in example operations of FIG. 7, comprise obtaining, (operation 702) by a user equipment comprising a processor, threshold values, wherein the threshold values are associated with respective beams of a search space. Aspects comprise comparing (operation 704), by the user equipment, respective measured reference signal received power values of the respective beams with the threshold values associated with the respective beams and determining (operation 706), by the user equipment, that a first measured reference signal received power value of a first selected control channel beam, of the respective measured reference signal received power values of the respective beams, does not satisfy a first function of a first threshold value associated with the first selected control channel beam, and that a second measured reference signal received power value of a second selected control channel beam, of the respective measured reference signal received power values of the respective beams, satisfies a second function of a second threshold value associated with the second selected control channel beam. Aspects include, in response to the determining, reporting (operation 708), by the user equipment, a partial control beam failure to a network device.

Reporting the partial control beam failure to the network device may comprise reporting a first index of the first selected beam in association with the first measured reference signal received power value. Reporting the partial control beam failure to the network device may comprise transmitting a partial control beam failure report via the second selected control channel beam. Reporting the partial control beam failure to the network device may comprise transmitting a partial control beam failure report via a physical uplink control channel that is the physical uplink control channel used for a beam management procedure.

Obtaining the threshold values may comprise receiving the threshold values from the network device, in which at least one threshold value is different from another threshold value. Obtaining the threshold values may comprise receiving the threshold values from the network device, in which at least one threshold value is based on a quality of service characteristic for an associated selected control channel beam. Obtaining the threshold values may comprise receiving the threshold values from the network device, in which at least one threshold value is based on a reference signal type.

Figure 8:
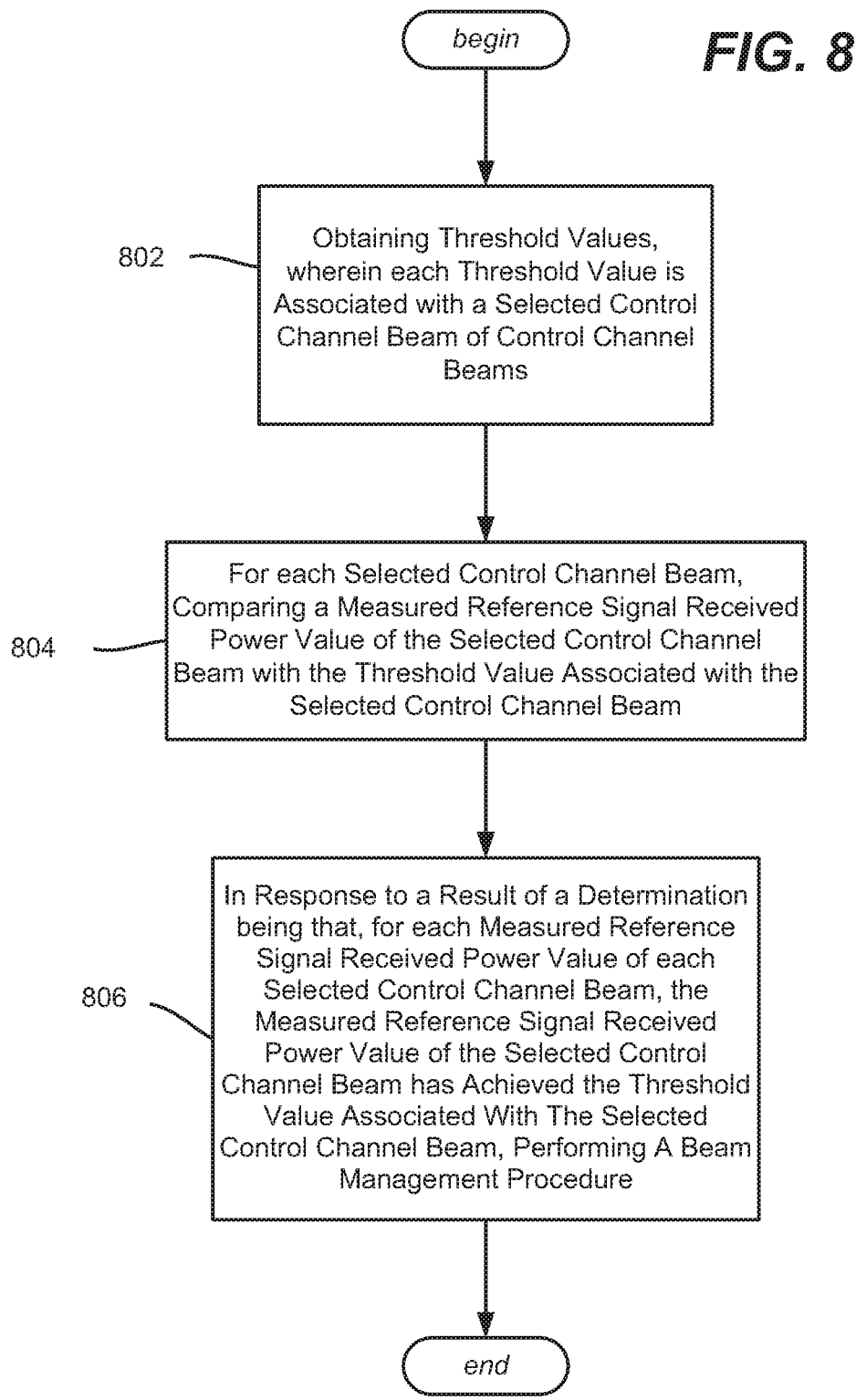
FIG. 8 illustrates an example flow diagram of aspects of user equipment operations, in accordance with various aspects and implementations of the subject disclosure.

One or more aspects, represented in FIG. 8 comprise obtaining threshold values, (block 802) wherein each threshold value is associated with a selected control channel beam of control channel beams. As represented via block 804, for each selected control channel beam, aspects comprise comparing a measured reference signal received power value of the selected control channel beam with the threshold value associated with the selected control channel beam. As represented via block 806, aspects comprise, in response to a result of a determination being that, for each measured reference signal received power value of each selected control channel beam, a measured reference signal received power value of the selected control channel beam has achieved the threshold value associated with the selected control channel beam, and another measured reference signal received power value of the selected control channel beam has not achieved the threshold value associated with the selected control channel beam, reporting a partial control beam failure to a network device.

In response to a result of a determination being that, for each measured reference signal received power value of each selected control channel beam, each measured reference signal received power value of the selected control channel beam has achieved the threshold value associated with the selected control channel beam, aspects may comprise performing a beam management procedure the performing the beam management procedure. The beams may be arranged in subgroups of a larger group, and performing the beam management procedure may comprise reporting a maximum channel state information reference signal for each subgroup.

The reporting the partial control beam failure to the network device may comprise, for each selected control channel beam that does not achieve the threshold value associated with the selected control channel beam, reporting an index of the selected control channel beam and the measured reference signal received power value associated with the selected control channel beam. Reporting the partial control beam failure to the network device may comprise transmitting a partial control beam failure report via a physical uplink control channel that is the physical uplink control channel used in conjunction with a beam management procedure.

Aspects may include, in response to the result of the determination being that, for each measured reference signal received power value of each selected control channel beam, the measured reference signal received power value of each selected control channel beam has not achieved the threshold value associated with the selected control channel beam, performing a beam recovery procedure.

Obtaining the threshold values may comprise receiving the threshold values from the network device, and wherein a threshold value of the threshold values is based on a quality of service characteristic for an associated selected control channel beam. Obtaining the threshold values may comprise receiving the threshold values from the network device, and wherein a threshold value of the threshold values is based on a channel state information reference signal type. Obtaining the threshold values may comprise receiving the threshold values from the network device, and wherein a threshold value of the threshold values is based on a synchronization signal block reference signal type.

Figure 9:
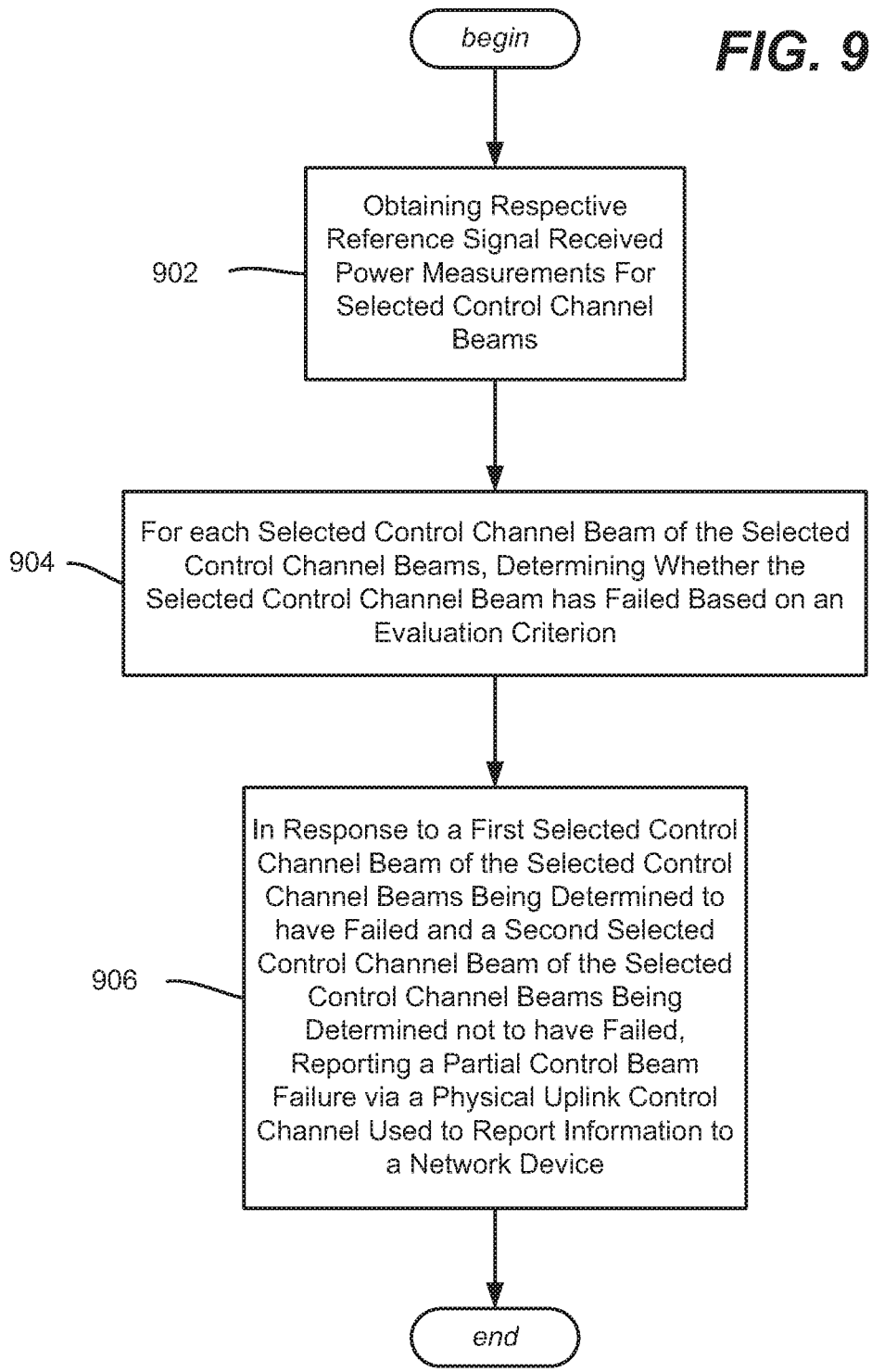
FIG. 9 illustrates an example flow diagram of aspects of user equipment operations, in accordance with various aspects and implementations of the subject disclosure.

One or more aspects, exemplified as example operations in FIG. 9, comprise obtaining respective reference signal received power measurements for selected control channel beams (operation 902). As represented via operation 904, for each selected control channel beam of the selected control channel beams, aspects comprise determining whether the selected control channel beam has failed based on an evaluation criterion. As represented via operation 906, in response to a first selected control channel beam of the selected control channel beams being determined to have failed and a second selected control channel beam of the selected control channel beams being determined not to have failed, reporting a partial control beam failure via a physical uplink control channel used to report information to a network device.

Determining whether the selected control channel beam has failed based on the evaluation criterion may comprise comparing a reference signal received power measurement for a beam, of the respective reference signal received power measurements for the selected control channel beams, with a threshold value associated with the beam. Other aspects may comprise receiving the threshold value for the beam, and/or, in response to determining that no selected control channel beam of the selected control channel beams has failed, performing a beam management procedure that uses the physical uplink control channel to report to the network device.

Figure 10:
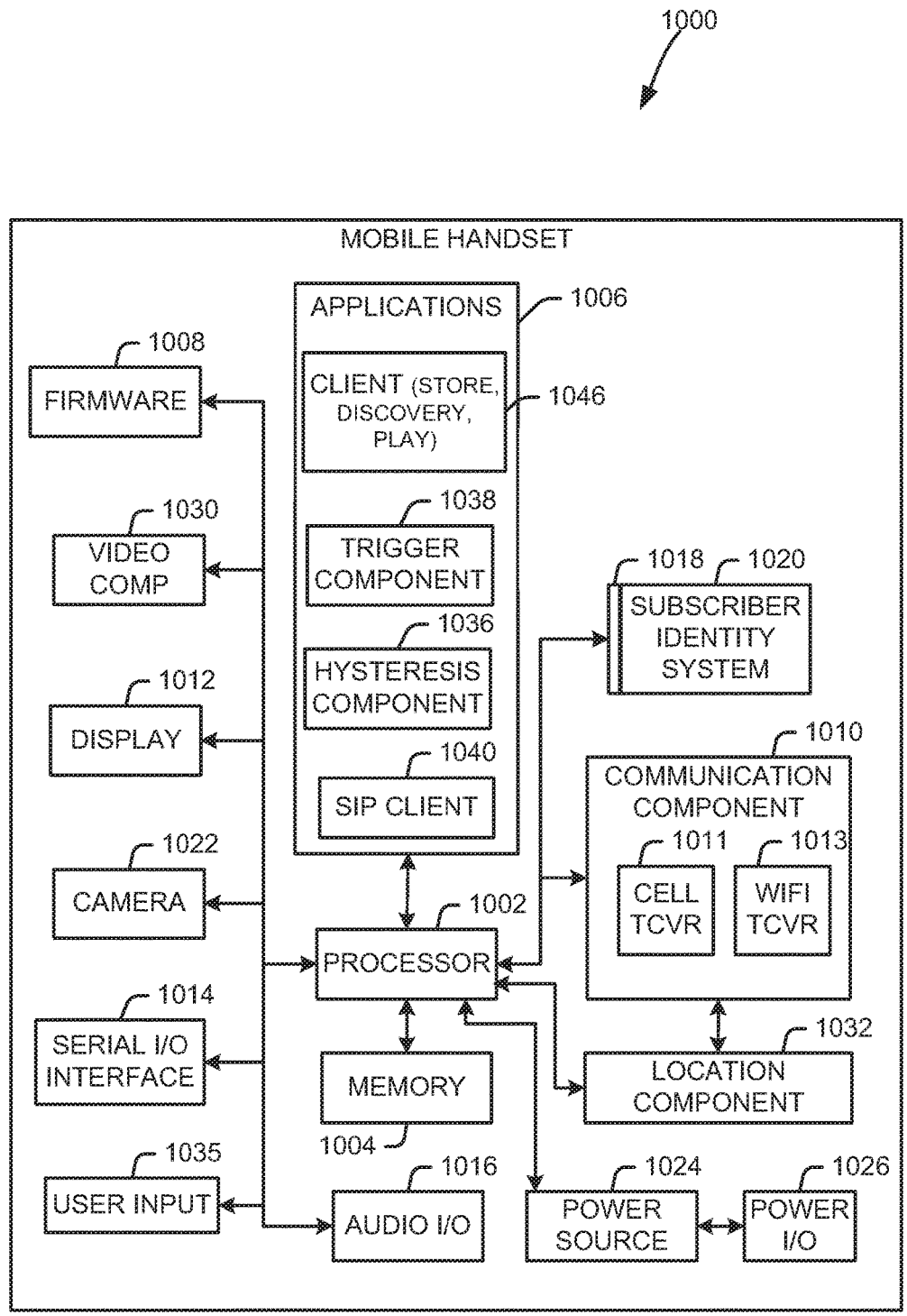
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, main-frame computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
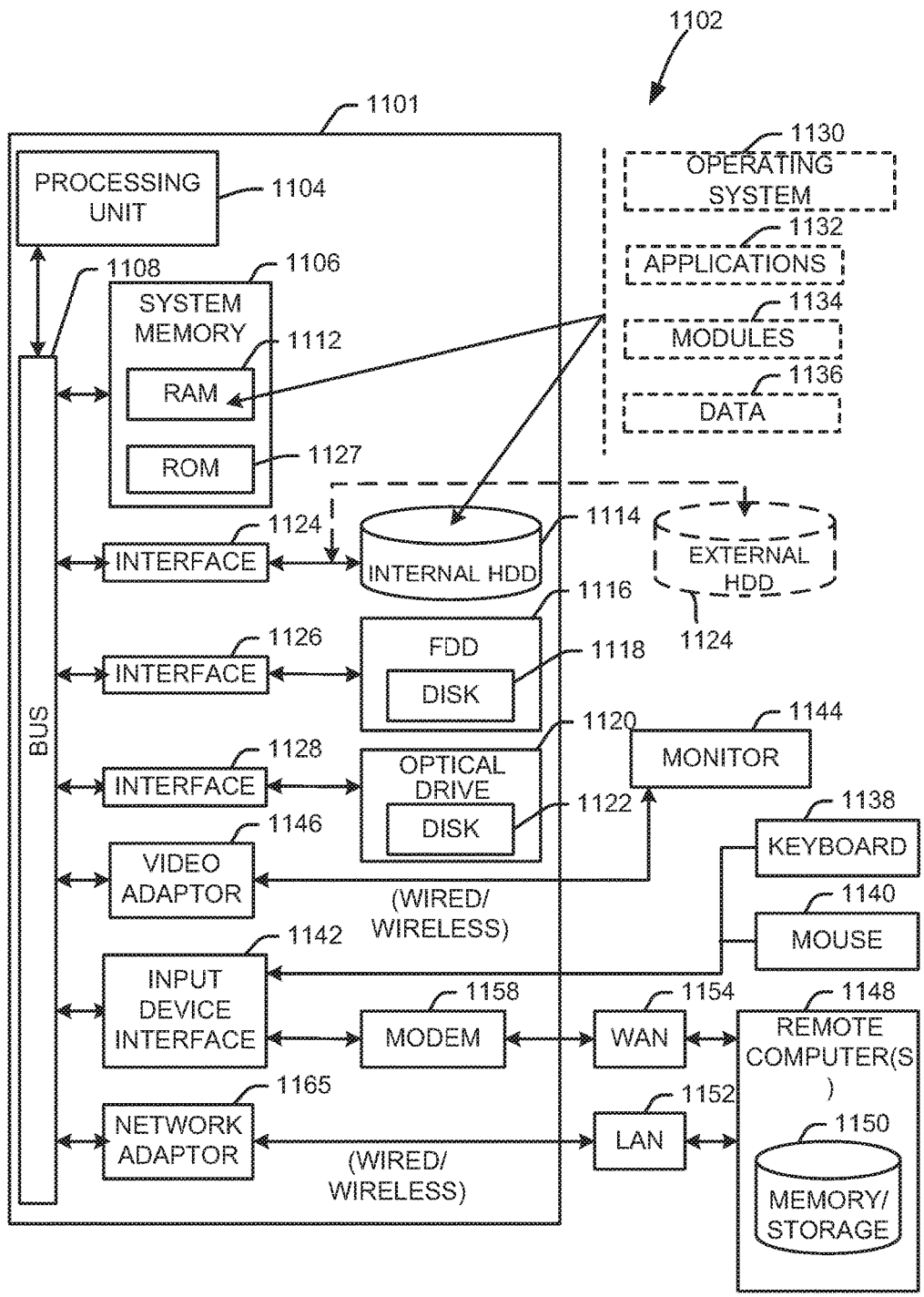
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 1120, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    obtaining, by a user equipment comprising a processor, threshold values, wherein the threshold values are associated with respective beams of a selected control channel search space;
    comparing, by the user equipment, respective measured reference signal received power values of the respective beams with the threshold values associated with the respective beams; and
    in response to determining, based on the comparing, a partial control beam failure wherein fewer than all of the respective beams, with respective threshold values of the threshold values, have measured reference signal received power values that do not satisfy the respective threshold values, transmitting, by the user equipment to a network device, a partial control beam failure report via a physical uplink control channel that is the physical uplink control channel for a beam management procedure.

2. The method of claim 1, wherein the transmitting the partial control beam failure report to the network device comprises reporting an index of a first selected control channel beam in association with a first measured reference signal received power value.

3. The method of claim 2, wherein the transmitting the partial control beam failure report to the network device further comprises transmitting the partial control beam failure report via a second selected control channel beam.

4. The method of claim 1, wherein the obtaining the threshold values comprises receiving the threshold values from the network device, in which at least one threshold value of the threshold values is based on a quality of service characteristic for an associated selected control channel beam.

5. The method of claim 1, wherein the obtaining the threshold values comprises receiving the threshold values from the network device, in which at least one threshold value of the threshold values is based on a reference signal type.

6. The method of claim 1, wherein the respective threshold values of the fewer than all of the respective beams are first respective threshold values, and wherein the partial control beam failure is indicative that other beams of the respective beams, other than the fewer than all of the respective beams, have satisfied second respective threshold values of the threshold values applicable to the other beams.

7. The method of claim 1, wherein the respective beams are arranged in subgroups of a larger group, and further comprising performing, by the user equipment, the beam management procedure comprising reporting a maximum channel state information reference signal for each subgroup of the subgroups.

8. A user equipment, comprising:
a processor; and
a memory that stores executable instructions that, when executed by the processor, facilitate performance of operations, the operations comprising:
obtaining threshold values, wherein the threshold values are associated with respective beams of a selected control channel search space;
comparing respective measured reference signal received power values of the respective beams with the threshold values associated with the respective beams; and
in response to determining, based on the comparing, a partial control beam failure where a first group of the respective beams, comprising some and not all of the respective beams, have measured reference signal received power values that do not satisfy first threshold values of the threshold values associated with the first group of respective beams, transmitting, to a network device, a partial control beam failure report via a physical uplink control channel that is the physical uplink control channel for a beam management procedure.

9. The user equipment of claim 8, wherein the transmitting the partial control beam failure report to the network device comprises reporting a first index of a first selected control channel beam in association with a first measured reference signal received power value.

10. The user equipment of claim 9, wherein the transmitting the partial control beam failure report to the network device comprises transmitting the partial control beam failure report via a second selected control channel beam.

11. The user equipment of claim 8, wherein the obtaining the threshold values comprises receiving the threshold values from the network device, in which at least one threshold value of the threshold values is based on a quality of service characteristic for an associated selected control channel beam.

12. The user equipment of claim 8, wherein the obtaining the threshold values comprises receiving the threshold values from the network device, in which at least one threshold value of the threshold values is based on a reference signal type.

13. The user equipment of claim 8, wherein the partial control beam failure is indicative of the first group of the respective beams, and further indicative a second group of the respective beams that have measured reference signal received power values that satisfy second respective threshold values of the threshold values applicable to the second group of the respective beams.

14. The user equipment of claim 8, wherein the respective beams are arranged in subgroups of a larger group, and the operations further comprising performing the beam management procedure comprising reporting a maximum channel state information reference signal for each subgroup of the subgroups.

15. A non-transitory machine-readable medium, comprising executable instructions that, when executed by a processor of a user equipment, facilitate performance of operations, the operations comprising:
obtaining threshold values, wherein the threshold values are associated with respective beams of a selected control channel search space;
comparing respective measured reference signal received power values of the respective beams with the threshold values associated with the respective beams; and
in response to determining, based on the comparing, a partial control beam failure where some and not all of the respective beams have measured reference signal received power values that do not satisfy first threshold values associated with the some and not all of the respective beams, transmitting, to a network device, a partial control beam failure report via a physical uplink control channel that is the physical uplink control channel for a beam management procedure.

16. The non-transitory machine-readable medium of claim 15, wherein the partial control beam failure report to the network device comprises reporting a first index of a first selected control channel beam in association with a first measured reference signal received power value.

17. The non-transitory machine-readable medium of claim 16, wherein the partial control beam failure report to the network device comprises transmitting the partial control beam failure report via a second selected control channel beam.

18. The non-transitory machine-readable medium of claim 15, wherein the obtaining the threshold values comprises receiving the threshold values from the network device, in which at least one threshold value of the threshold values is based on a quality of service characteristic for an associated selected control channel beam.

19. The non-transitory machine-readable medium of claim 15, wherein the obtaining the threshold values comprises receiving the threshold values from the network device, in which at least one threshold value of the threshold values is based on a reference signal type.

20. The non-transitory machine-readable medium of claim 15, wherein the partial control beam failure is indicative of the first number of beams comprising the some and not all of the respective beams, and further indicative of a second number of beams of the respective beams that have satisfied second respective threshold values of the threshold values applicable to the second number of beams.

* * * * *